(12) United States Patent
Tong et al.

(10) Patent No.: US 6,736,016 B1
(45) Date of Patent: May 18, 2004

(54) PAINT BOOTH AIR DETECTION SYSTEM

(75) Inventors: Ernest Henry Tong, Canton, MI (US); Prasad Dev Hanumalagutti, Inkster, MI (US)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 10/250,188

(22) Filed: Jun. 11, 2003

(51) Int. Cl.[7] .................................................. G01F 1/37
(52) U.S. Cl. ......................... 73/861.52; 454/50; 118/719
(58) Field of Search ........................ 73/861.52, 861.42, 73/1.57–1.59, 1.61–1.64; 118/712, 719, 314, 326; 454/50–52

(56) References Cited

U.S. PATENT DOCUMENTS

| | | | |
|---|---|---|---|
| 4,261,256 A | 4/1981 | Joret | |
| 5,356,335 A | 10/1994 | Matsui et al. | |
| 5,820,456 A | 10/1998 | Nelson | |
| 6,139,421 A | 10/2000 | Tong et al. | |
| 6,146,264 A | * 11/2000 | Tong et al. | .................. 454/52 |
| 6,493,638 B1 | * 12/2002 | McLean et al. | ................ 702/22 |
| 6,502,629 B2 | * 1/2003 | Valachovic | ................. 165/263 |
| 6,644,092 B1 | * 11/2003 | Oppel | ......................... 73/1.61 |

* cited by examiner

Primary Examiner—Edward Lefkowitz
Assistant Examiner—Corey D. Mack
(74) Attorney, Agent, or Firm—Raymond L. Coppiellie

(57) ABSTRACT

An airflow detection system for a vehicle paint booth. The vehicle paint booth has a first zone and a second zone adjacent to the first zone. An air velocity sensor measures airflow passing between the first zone and the second zone. An air deflector having at least one air deflection surface is located near the flow velocity sensor. At least one air deflection surface directs the airflow toward the flow velocity sensor to improve the reliability of the airflow detection system.

20 Claims, 4 Drawing Sheets

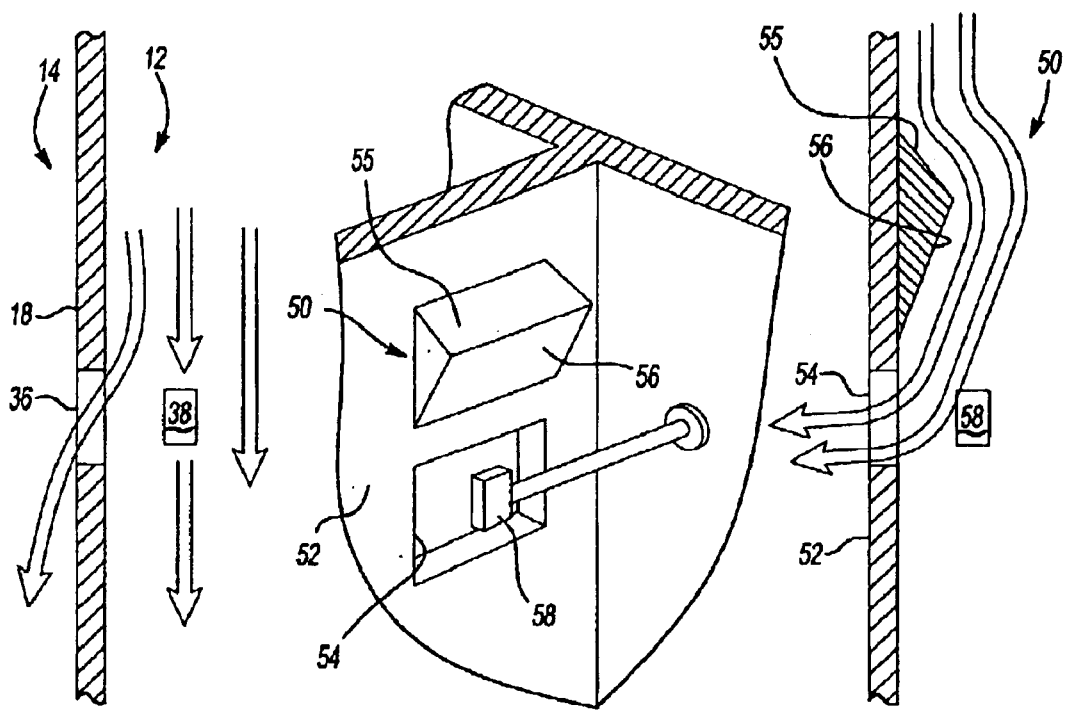
*Fig-2*     *Fig-3*     *Fig-4*
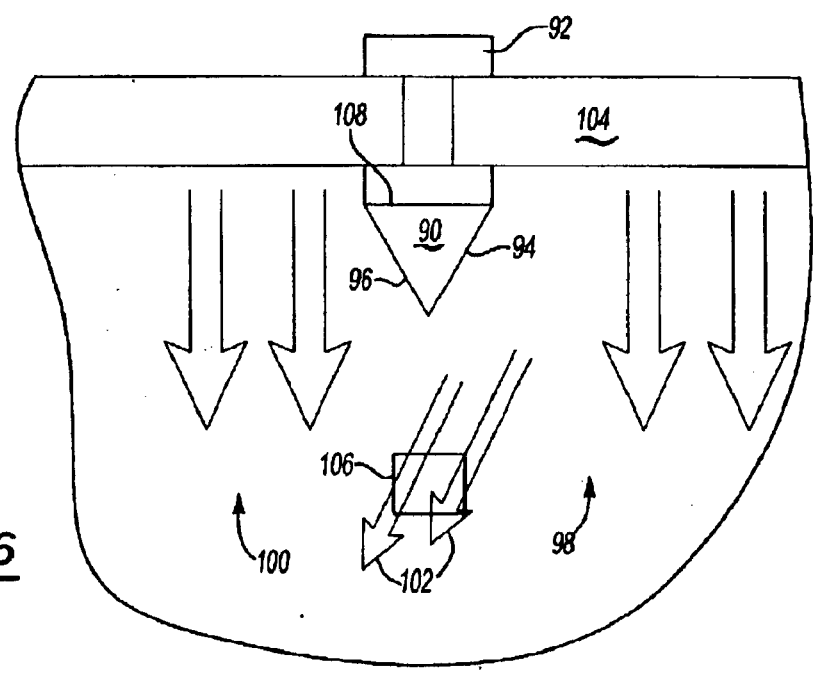
*Fig-6*

PAINT BOOTH AIR DETECTION SYSTEM

BACKGROUND OF INVENTION

1. Field of the Invention

The present invention relates to a system for detecting airflow in a vehicle paint booth.

2. Background Art

Paint booths are used to paint automotive vehicle bodies. A paint booth is divided into multiple zones that may be separated by partition walls. Different operations are performed in each zone. For example, a first zone can be used to remove contaminants from the vehicle body, a second zone can be used to apply a base color or metallic paint flakes, a third zone can be used to apply a clear coat finish, and a fourth zone can be used to "flash off" undesired paint solvents. These operations may be conducted by technicians or by robots.

Excess paint mist and airborne particles tend to accumulate within each zone due to the coating processes. These mists and airborne particulates are removed from each zone by passing air through a perforated ceiling and down through the floor of the paint booth. Problems can occur if adjacent zones have different air pressures. Specifically, if one zone has higher air pressure than an adjacent zone, then undesirable cross flow is produced where air moves from the high pressure zone into the adjacent low pressure zone. This cross flow can carry dirt and contaminants into a neighboring zone and contaminate the vehicle body. In addition, cross flow can misdirect the spray of paint and cause uneven painting. Cross flow can also carry different colored paint mists between zones and degrade the quality of the paint finish.

Flow velocity sensors are often mounted in each paint booth zone to detect the velocity of air passing between adjacent zones. In a paint booth with partitions it can be difficult to position a flow velocity sensor to reliably detect cross flow between adjacent zones because the sensitivity of the flow velocity sensor may depend on the direction of airflow. In a paint booth without partitions it is desirable to mount flow velocity sensors between the zones and near the ceiling to reduce the risk of damage, avoid interference with painting operations, and reduce the likelihood of paint contamination on a sensor. Unfortunately, sensors located near the ceiling of a non-partitioned paint booth do not reliably detect cross flow because of air turbulence near ceiling beams and other paint booth structures.

Before the Applicant's invention there was a need for a system to accurately detect airflow between adjacent zones of partitioned and non-partitioned vehicle paint booths. Problems associated with the prior art as noted above and other problems are addressed by the Applicant's invention as summarized below.

SUMMARY OF INVENTION

According to one aspect of the present invention, an airflow detection system and vehicle paint booth are provided. The vehicle paint booth has a partition that separates a first zone from a second zone. The partition includes an aperture that permits air to flow between the first zone and the second zone. A flow velocity sensor is located in the first zone near the aperture and measures the airflow passing through the aperture. An air deflector is disposed on the partition in the first zone near the aperture. The air deflector has at least one air deflection surface spaced from the flow velocity sensor. The air deflection surface directs the airflow passing through the aperture toward the flow velocity sensor to improve the reliability of the system. The flow velocity sensor may be located below the air deflection surface of the air deflector. An adjustable support arm may be used to position the flow velocity sensor or anemometer relative to the air deflector.

According to another aspect of the invention, an airflow detection system for a vehicle paint booth without partitions may be provided. The vehicle paint booth has a first zone and a second zone adjacent to the first zone. A flow velocity sensor is disposed between the first zone and the second zone and measures the airflow between the zones. An air deflector having at least one air deflection surface is disposed near the flow velocity sensor. The air deflection surface reduces turbulence in the airflow near the flow velocity sensor to improve system reliability. A first air deflection surface may be located in the first zone and a second air deflection surface may be located in the second zone. The air deflector may be attached to a beam of the vehicle paint booth to influence the air turbulence beneath the beam.

According to other aspects of the invention, the air deflector may have a vertical axis longer or shorter than a horizontal axis. In addition, the air deflector may have a triangular cross-section. The air deflection surface may be concave, convex, dimpled, substantially planar, or combine various combinations of these surfaces.

BRIEF DESCRIPTION OF DRAWINGS

FIG. 2 is a side view of airflow in a partitioned vehicle paint booth without an air detection system;

FIG. 3 is a perspective view of a partitioned vehicle paint booth with an air detection system;

FIG. 4 is a side view of airflow in a partitioned vehicle paint booth with an air detection system;

FIG. 6 is a side view of an air detection system in a vehicle paint booth without partitions;

DETAILED DESCRIPTION

Figure 1:
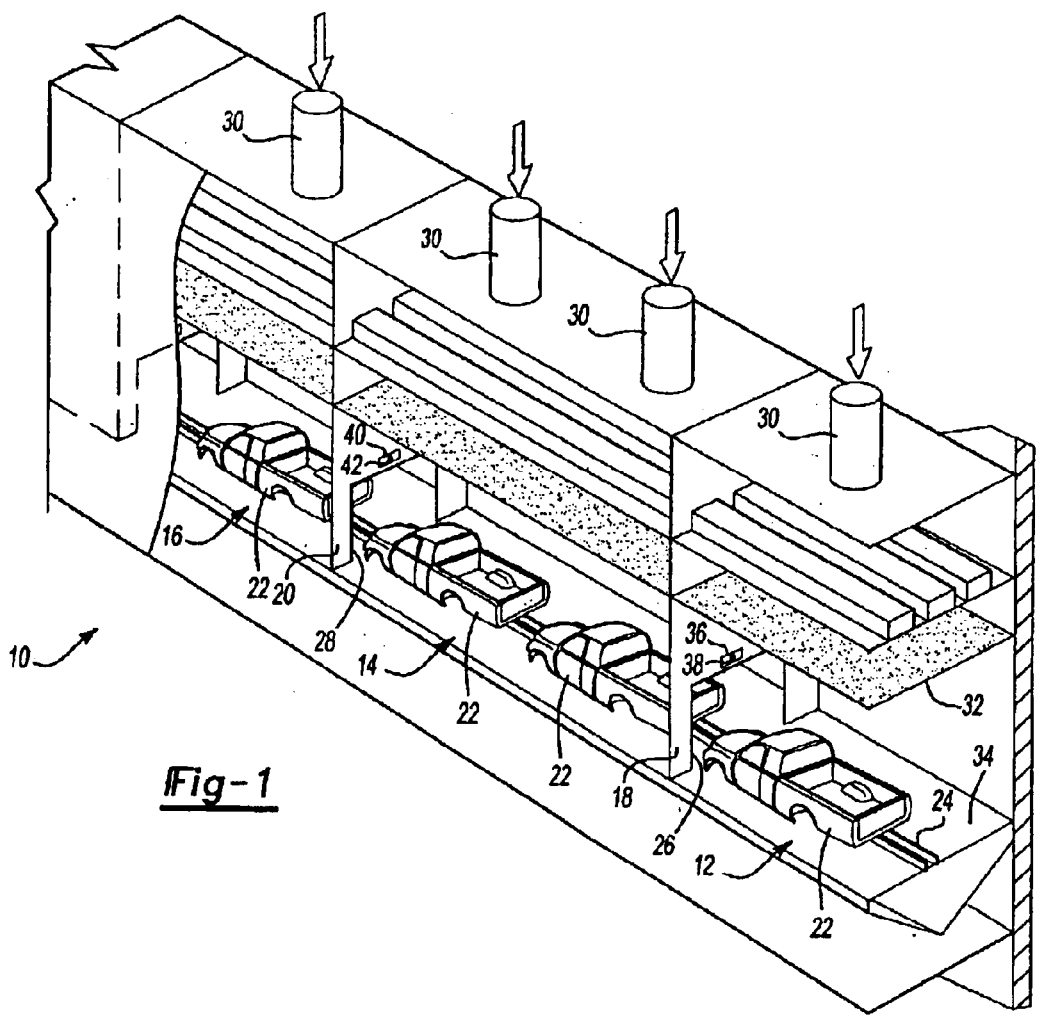
FIG. 1 is a perspective view of a vehicle paint booth where adjacent zones are separated by partitions.

Referring to FIG. 1, a vehicle paint booth 10 is shown. The vehicle paint booth 10 is divided into a first zone 12, a second zone 14 and a third zone 16. The first zone 12 and the second zone 14 are separated by a first partition 18. The second zone 14 and the third zone 16 are separated by a second partition 20. Vehicle bodies 22 are transported through the paint booth on a conveyor 24. Vehicle bodies 22 pass from the first zone 12 to the second zone 14 through a first partition opening 26. Vehicle bodies 22 pass from the second zone 14 to the third zone 16 through a second partition opening 28.

Air is provided to the paint booth 10 via air inlets 30. Air travels through the air inlets 30 and passes through a perforated ceiling 32 into each paint booth zone. The air moves downwardly through each zone and exits through a perforated or grated floor 34. The first partition 18 has an aperture 36 located near the first partition opening 26. A flow velocity sensor 38 is located near the aperture 36. Likewise, the second partition 20 also has an aperture 40 located near the second partition opening 28 near which a flow velocity sensor 42 is located. If the air pressure in the first zone 12 is different than the air pressure in the second zone 14, air will move through the aperture 36. The flow velocity sensor 38 detects airflow through the aperture 36. Measurements from the flow velocity sensor 38 can be used to control inlet or exhaust fans and equalize the air pressure between the first zone 12 and the second zone 14.

Referring to FIG. 2, a more detailed view of the airflow in a partitioned vehicle paint booth is shown. The flow velocity sensor 38 measures horizontal air movement between the first zone 12 and the second zone 14. Air will move through the aperture 36, as shown, if the air pressure in the first zone 12 is greater than the air pressure in the second zone 14. When the difference in air pressure between the first zone 12 and the second zone 14 is small, only the airflow near the partition 18 passes through the aperture 36 as shown by the curved arrow. Airflow at a certain distance away from the partition 18 does not deviate substantially as shown by the straight arrows. As a result, the flow velocity sensor 38 does not reliably detect the cross flow when there is a small pressure differential between the first zone 12 and the second zone 14.

Referring to FIG. 3, a partitioned vehicle paint booth with an air detection system is shown. An air deflector 50 is disposed on a partition 52 above an aperture 54. The air deflector 50 has a first air deflection surface 55 and a second air deflection surface 56 that directs air toward a flow velocity sensor 58 located near the aperture 54 to more reliably detect airflow through the aperture 54.

Referring to FIG. 4, the airflow in a partitioned vehicle paint booth with an air detection system is shown. In the preferred embodiment, a first air deflection surface 55 meets the partition 52 at an angle as shown. The first air deflection surface 55 redirects air near the surface of the partition 52 toward the second air deflection surface 56. The second air deflection surface 56 redirects air toward the flow velocity sensor 58 as shown by the curved arrows. As a result, the airflow through the aperture 54 is more readily detected by the flow velocity sensor 58 and detection reliability is improved.

Figure 5:
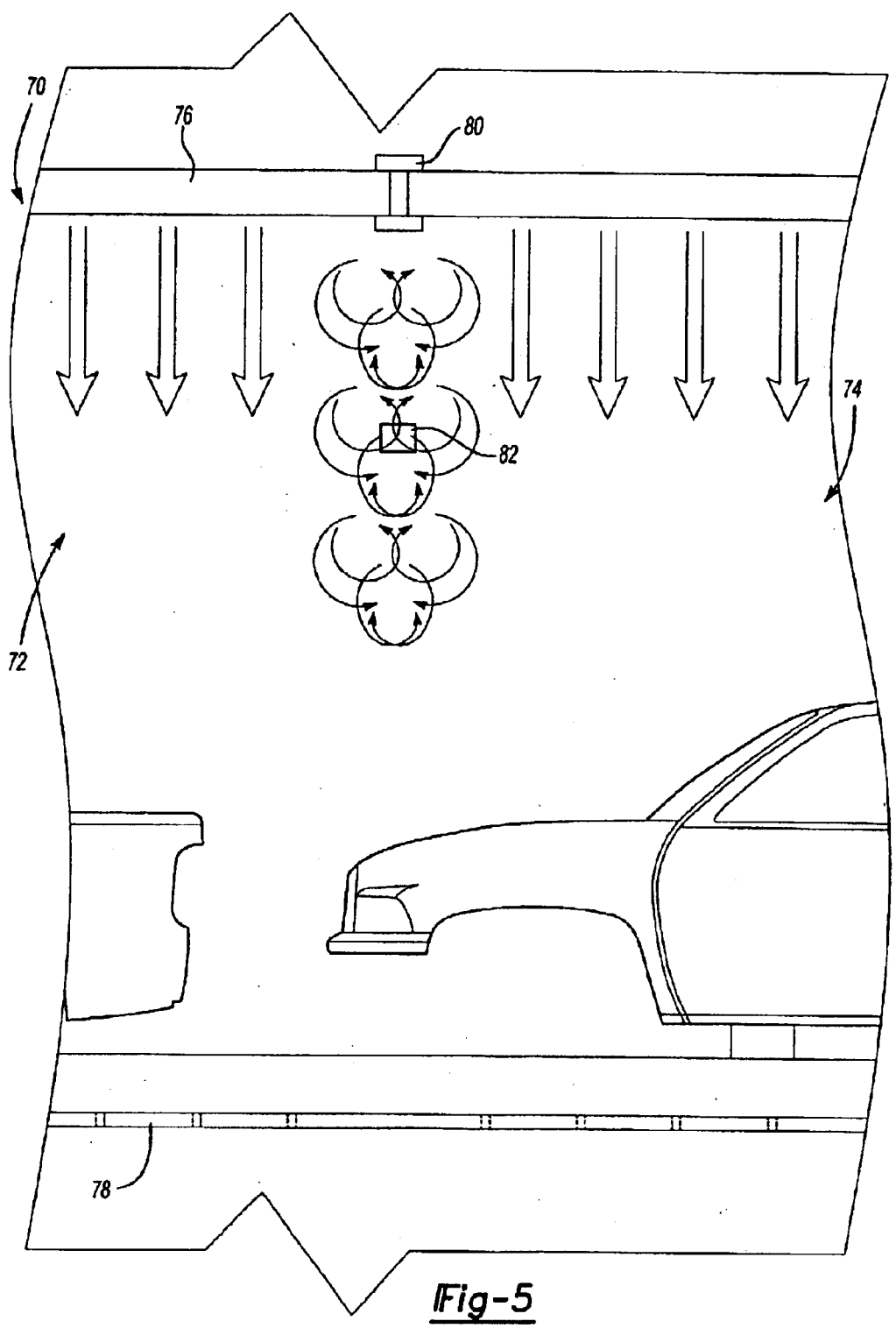
FIG. 5 is a side view of two zones of a vehicle paint booth where adjacent zones are not separated by partitions.

Referring to FIG. 5, a side view of a non-partitioned vehicle paint booth is shown. The non-partitioned paint booth 70 has a first zone 72 and a second zone 74. Air is provided through a perforated ceiling 76 into the first zone 72 and the second zone 74. Air generally flows from the perforated ceiling 76 down through the floor 78 and exits each zone. However, the air underneath a ceiling beam 80 tends to swirl due to a low pressure vortex that is created under the beam 80 as denoted by the curved arrows. A flow velocity sensor 82 located under the beam will not accurately detect cross flow between the first zone 72 and the second zone 74 because the swirling air causes anomalous sensor readings.

Referring to FIG. 6, a portion of a non-partitioned paint booth with an air detection system is shown. An air deflector 90 is disposed underneath a ceiling beam 92. The air deflector 90 has a first air deflection surface 94 and a second air deflection surface 96. The first air deflection surface 94 is located in the first zone 98. The second air deflection surface 94 is located in the second zone 100. Air flows from the first zone 98 to the second zone 100 as shown by the arrows 102 when the first zone 98 has higher air pressure than the second zone 100. The first air deflection surface 94 deflects the airflow near the ceiling 104 of the first zone 98 and reduces air turbulence underneath the beam 92. Since turbulence is reduced, a flow velocity sensor 106 may be mounted under the beam 92 that can more reliably detect the cross flow between the first zone 98 and the second zone 100. The air deflector can extend over the entire length of the beam 92. Alternatively, the air deflector 90 can be shorter than the beam 92. In addition, the air deflector 90 can be wider or narrower than the beam surface 108.

Referring to FIGS. 7a–7h, various cross sections of an air deflector for use in a partitioned vehicle paint booth are shown. In these embodiments, the vertical axis of the air deflector denoted by the letter V is shown as being greater than the horizontal axis of the air deflector denoted by the letter H. Alternatively, the horizontal axis may be than the vertical axis in each embodiment.

Figure 7A:
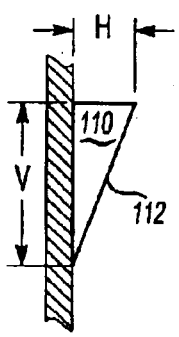
FIGS. 7a–7h are air deflector cross-sections for use in a partitioned vehicle paint booth.

FIG. 7a shows an air deflector 110 with a triangular cross-section and a substantially planar air deflection surface 112. The term substantially planar as used in this application is defined as having a surface that appears to be generally flat on normal visual inspection.

Figure 7B:
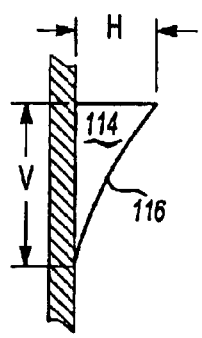

FIG. 7b shows an air deflector 114 with a concave air deflection surface 116.

Figure 7C:
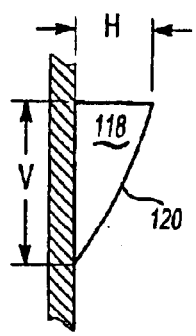

FIG. 7c shows an air deflector 118 with a convex air deflection surface 120.

Figure 7D:
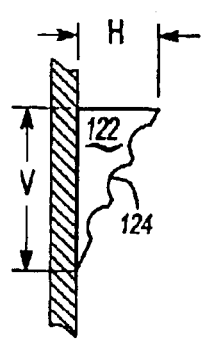

FIG. 7d shows an air deflector 122 with a dimpled air deflection surface 124.

Figure 7E:
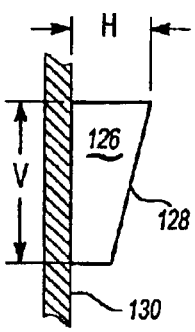

FIG. 7e shows an air deflector 126 with a trapezoidal cross-section and a substantially planar air deflection surface 128 that does not contact the partition 130.

Figure 7F:
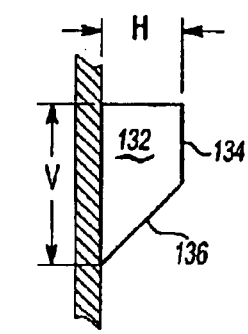

FIG. 7f shows an air deflector 132 with a trapezoidal cross section having a first air deflection surface 134 and a second air deflection surface 136.

Figure 7G:
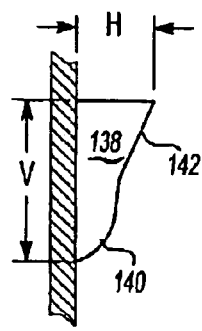

FIG. 7g shows an air deflector 138 similar to that shown in FIG. 7e with the addition of a second air deflector surface 140 adjacent to a substantially planar first air deflector surface 142. The second air deflector surface 140 is shown as being convex.

Figure 7H:
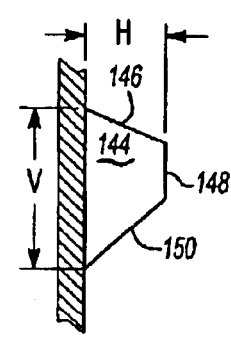

FIG. 7h shows an air deflector 144 with a first air deflection surface 146, a second air deflection surface 148, and a third air deflection surface 150.

Referring to FIGS. 8A–8H, various embodiments of an air deflector for use in a non-partitioned vehicle paint booth are shown. In these embodiments, the vertical axis of the air deflector denoted by the letter V is shown as being greater than the horizontal axis of the air deflector denoted by the letter H. Alternatively, the horizontal axis may be greater than the vertical axis in each embodiment.

Figure 8A:
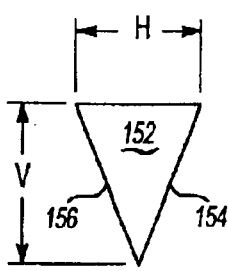
FIGS. 8a–8h are air deflector cross-sections for use in a vehicle paint booth without partitions.

FIG. 8a shows an air deflector 152 with a triangular cross-section having a first air deflection surface 154 and a second air deflection surface 156 that are substantially planar.

Figure 8B:
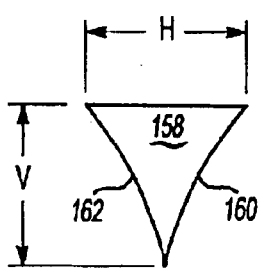

FIG. 8b shows a air deflector 158 with a concave first air deflector surface 160 and a concave second air deflection surface 162.

Figure 8C:
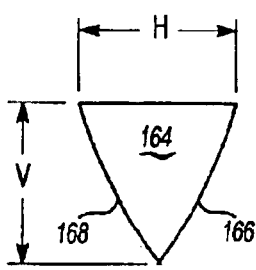

FIG. 8c shows an air deflector 164 with a convex first air deflection surface 166 and a convex second air deflection surface 168.

Figure 8D:
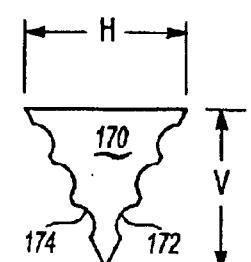

FIG. 8d shows an air deflector 170 with a dimpled first air deflection surface 172 and a dimpled second air deflection surface 174.

Figure 8E:
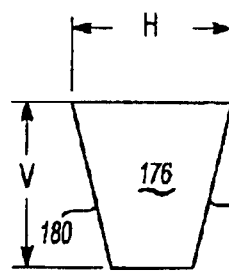

FIG. 8e shows an air deflector 176 with a trapezoidal cross-section and a planar first air deflection surface 178 and a planar second air deflection surface 180.

Figure 8F:
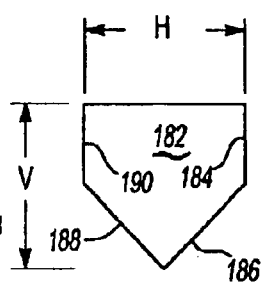

FIG. 8f shows an air deflector 182 with a pentagonal cross-section and first 184, second 186, third 188, and fourth 190 deflection surfaces.

Figure 8G:
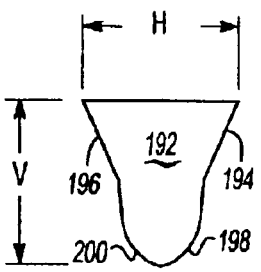

FIG. 8g shows an air deflector 192 with two substantially planar air deflection surfaces 194, 196 and two convex air deflection surfaces 198, 200.

Figure 8H:
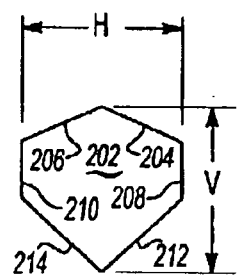

FIG. 8h shows an air deflector 202 with a hexagonal cross-section and six substantially planar air deflection surfaces 204, 206, 208, 210, 212, 214.

Alternate embodiments of the air detection system may be created by combining air deflection surfaces in a variety of ways. For example, any combination of dimpled, concave, convex, and substantially planar air deflection surfaces may be used.

While the best mode for carrying out the invention has been described in detail, those familiar with the art to which this invention relates will recognize various alternative designs and embodiments for practicing the invention as defined by the following claims.

What is claimed is:

1. In combination, an airflow detection system and a vehicle paint booth, the vehicle paint booth having a partition that separates a first zone from a second zone, comprising:
    an aperture in the partition that permits an airflow between the first zone and the second zone;
    a flow velocity sensor located in one of the first and second zones near the aperture that measures the airflow passing through the aperture;
    an air deflector disposed on the partition near the aperture having at least one air deflection surface spaced from the flow velocity sensor that directs the airflow passing through the aperture toward the flow velocity sensor to improve the reliability of the system.

2. The combination of an airflow detection system and a vehicle paint booth of claim 1 wherein the flow velocity sensor is located below the at least one air deflection surface of the air deflector.

3. The combination of an airflow detection system and a vehicle paint booth of claim 1 wherein the at least one air deflection surface is concave.

4. The combination of an airflow detection system and a vehicle paint booth of claim 1 wherein the at least one air deflection surface is convex.

5. The combination of an airflow detection system and a vehicle paint booth of claim 1 wherein the at least one air deflection surface is substantially planar.

6. The combination of an airflow detection system and a vehicle paint booth of claim 1 wherein the at least one air deflection surface is dimpled.

7. The combination of an airflow detection system and a vehicle paint booth of claim 1 wherein at least one air deflection surface further comprises a first air deflection surface that is substantially planar and a second air deflection surface that is substantially planar, concave, convex, or dimpled.

8. The combination of an airflow detection system and a vehicle paint booth of claim 1 wherein a vertical axis of the air deflector is longer than a horizontal axis of the air deflector.

9. The combination of an airflow detection system and vehicle paint booth of claim 1 wherein a horizontal axis of the air deflector is longer than a vertical axis of the air deflector.

10. The combination of an airflow detection system and a vehicle paint booth of claim 1 wherein an adjustable support arm positions the flow velocity sensor relative to the air deflector.

11. An airflow detection system for a vehicle paint booth, the vehicle paint booth having a first zone and a second zone adjacent to the first zone, comprising:
    a flow velocity sensor disposed between the first zone and the second zone that measures an airflow between the first zone and the second zone;
    an air deflector disposed near the flow velocity sensor having at least one air deflection surface spaced from the flow velocity sensor that reduces turbulence in the airflow near the flow velocity sensor to improve the reliability of the system.

12. The airflow detection system for a vehicle paint booth of claim 11 wherein the air deflector further comprises a first air deflection surface portion located in the first zone and a second air deflection surface located in the second zone.

13. The airflow detection system for a vehicle paint booth of claim 11 wherein the air deflector is attached to a beam of the vehicle paint booth to influence air turbulence beneath the beam.

14. The airflow detection system for a vehicle paint booth of claim 11 wherein an adjustable support arm positions the flow velocity sensor with respect to the air deflector.

15. The airflow detection system for a vehicle paint booth of claim 11 wherein a vertical axis of the air deflector is longer than a horizontal axis of the air deflector.

16. The airflow detection system for a vehicle paint booth of claim 11 wherein the air deflector has a triangular cross section.

17. The airflow detection system for a vehicle paint booth of claim 11 wherein the at least one air deflection surface is concave.

18. The airflow detection system for a vehicle paint booth of claim 11 wherein the at least one air deflection surface is convex.

19. The airflow detection system for a vehicle paint booth of claim 11 wherein the at least one air deflection surface is substantially planar.

20. The airflow detection system for a vehicle paint booth of claim 11 wherein the at least one air deflection surface is dimpled.

* * * * *